Patented June 10, 1924.

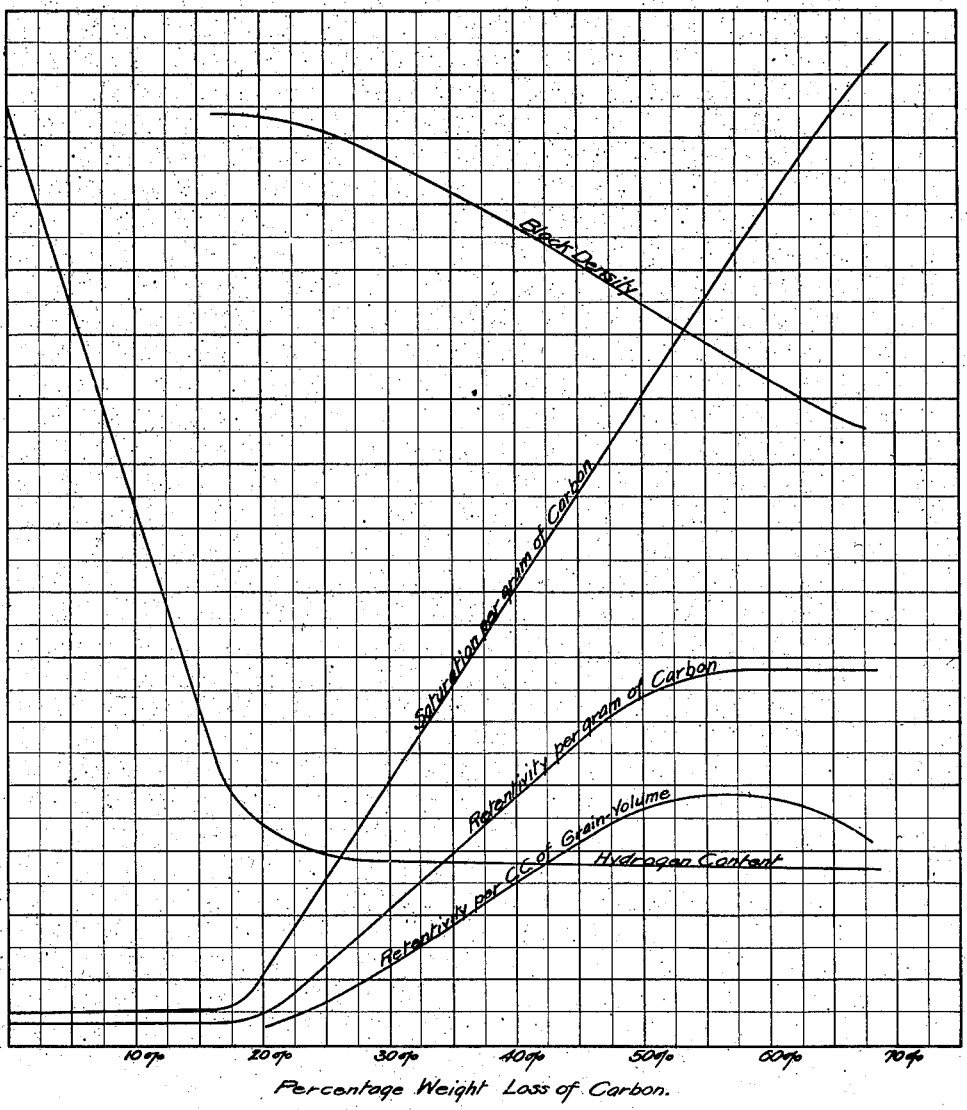

1,497,543

UNITED STATES PATENT OFFICE.

NEWCOMB K. CHANEY, OF LAKEWOOD, OHIO.

ADSORPTIVE CARBON AND PROCESS OF MAKING THE SAME.

Continuation of application Serial No. 251,263, filed August 24, 1918. This application filed June 30, 1919. Serial No. 307,620.

*To all whom it may concern:*

Be it known that I, NEWCOMB K. CHANEY, a citizen of the United States, residing at Lakewood, in the county of Cuyahoga and State of Ohio, have invented certain new and useful Improvements in Adsorptive Carbon and Processes of Making the Same, of which the following is a specification.

This invention relates to processes of manufacturing highly active adsorbent carbon, and to the novel products resulting therefrom.

It has long been known that many kinds of charcoal will absorb gases, and that certain charcoals have a much greater capacity than others for taking up gases. The sorbed gas is readily expelled from most varieties of charcoal, for example by blowing air through it. So far as I am aware, the greater capacity of certain carbonaceous residues for sorbing gases has always been ascribed to the particular organic materials from which they were derived; and it was considered that high capacity was not possessed by and could not be imparted to other forms of carbon, such for example as carbon derived from hard or soft coals or other relatively cheap and abundant materials. While this was universally accepted as a fact, the reasons therefor were not known.

I have now discovered that the foregoing assumption is erroneous, and that by the proper application of certain basic principles herein disclosed it is possible to obtain a highly adsorptive carbon from a very wide variety of natural carbonaceous or carbon-containing materials including such deposits of mineral carbon as are not essentially graphitic in character. In fact, operating in accordance with these principles, I am able to prepare from ordinary hard or soft coal an active carbon which is far more adsorptive of gases than the best bone or wood charcoal heretofore available. Similarly, I am enabled to prepare from vegetable or animal products a form of carbon of greatly enhanced activity as regards adsorptive capacity for gases. These novel forms of carbon are susceptible of many industrial and military uses, including their use in defensive warfare against chlorpicrin, phosgene and other toxic gases which from a practical point of view are not adsorbed at all by the varieties of charcoal heretofore available.

Carbon may exist either in an active or in an inactive modification as regards adsorptive capacity for gases. Inactive carbon is relatively resistant to oxidation, and possesses to some degree certain of the characteristics of graphite, which is totally inactive. Inactive carbon is formed whenever hydrocarbons are decomposed or "cracked" at relatively high temperatures, as for example in the so-called "gas-treating" of coke. The temperature above which carbon is deposited in the inactive modification by the thermal decomposition of hydrocarbons cannot be stated in absolute terms, since it varies rather widely according to the furnacing conditions, but in general it may be said that carbon is deposited in the active modification at temperatures below about 500°–600° C., whereas at temperatures materially exceeding 600° C. a strong tendency exists toward the deposition of the inactive modification. Inactive carbon cannot, so far as now known, be effectively activated by any commercially practicable method.

Active carbon is formed therefore whenever carbon is deposited at relatively low temperatures by chemical or thermal decomposition of carbon-bearing materials. However, active carbon possesses an extremely high adsorptive capacity for hydrocarbons and as usually prepared it is practically saturated with adsorbed hydrocarbons, which prevent it from adsorbing other gases. It follows therefore that many carbonaceous products which actually contain a high proportion of active carbon are apparently inactive, or at most exhibit a low degree of activity. I have found however that if these adsorbed hydrocarbons are substantially removed, without, in the process of their removal, giving rise to deposits of inactive carbon, the resulting hydrocarbon-free material possesses extremely high activity or adsorptive capacity. As stated before this activity is quite independent of the origin of the carbon, provided it be not originally graphitic.

For clearness, I designate an active carbon base containing adsorbed hydrocarbons as a "primary carbon". Many commercial grades of animal and vegetable charcoal are of this character; so also are such cokes as result from the low-temperature distillation of bituminous coals, mineral bitumens or the like. Ordinary coke on the other hand is heavily charged with inactive carbon resulting from the "gas-treatment" to which it has been subjected in the commercial coking operation, and cannot therefore be regarded as a primary carbon, or as convertible into such. Anthracite coals may be regarded for the purposes of this invention as native primary carbons, since my researches have shown that they possess an active carbon base saturated with adsorbed hydrocarbons. Bituminous coals may be similarly regarded, although the hydrocarbons are usually present in such coals in great excess of the adsorptive capacity of the active carbon base, and such excess may be readily removed by distillation under proper conditions. A "primary carbon" is therefore essentially an adsorption-complex consisting of hydrocarbons adsorbed by a base of active carbon, with or without associated non-adsorbed hydrocarbons.

My process may be regarded as starting with a "primary carbon" as defined above, whether of animal, vegetable or mineral origin, and whether native or artificially prepared, it being essential only that it should be, for practical purposes, free from inactive carbon deposits such as result from gas-treating. My invention contemplates such further treatment of primary carbons as will eliminate adsorbed hydrocarbons, while leaving the active carbon base free from deposits of inactive carbon. In its preferred embodiment my invention further contemplates such treatment of the residual active carbon base as will increase the surface of the particle per unit of volume, this increase of surface relative to volume being preferably carried to the maximum attainable degree for carbon particles of a given size or grading.

I will now describe my invention by reference to a specific embodiment thereof, starting with a suitable primary carbon which should preferably have a relatively high apparent density, for example an apparent density in excess of 1.0. The reason underlying this choice of a dense primary carbon is explained below. Such material may be prepared for example by the distillation of bituminous coal or the denser cellulosic materials, bone or the like at temperatures not materially exceeding 500°–600° C., with proper precautions to eliminate all of the bituminous matter or hydrocarbons which can be volatilized at this temperature. If desired oxidizing conditions may be maintained during the distillation, in order to minimize the proportion of adsorbed hydrocarbons in the residual active carbon base. The heat should be applied as uniformly and regularly as possible, particularly avoiding any material amount of "gas-treatment" due to the hydrocarbons being cracked at local areas of higher temperature with deposition of inactive carbon. Or as stated above anthracite coal may be used directly as a primary carbon.

While bone is mentioned above to illustrate the general applicability of the process to be described, it should be noted that char having an exceedingly high ash content, such as that produced from bones, has entirely different properties from carbons of materially lower ash content, such as anthracite coals and nut charcoals. While the process to be described will activate bone-char to a high degree, known processes, because of properties inherent in bone-char, will give to the small percentage of carbon contained therein an activity approaching much more closely to that obtainable by my process than is the case when such known processes are applied to materials falling within my definition of primary carbon. A simple distillation will produce from bones a char in which the ash-free matter appears to have a considerable degree of activity. This is largely due to the fact that the very high proportion of inorganic matter present extends the carbonaceous portion to such a degree that the exposed surface approaches a magnitude which, in the case of materials in which carbon predominates, can only be obtained by limited oxidation. Bone-char is therefore not essentially a complex of active carbon and hydrocarbons, as defined above, since the inorganic matter present performs a function of very great importance, and is therefore essential.

Bone-char cannot be made into a material exhibiting as a whole a high activity because the inorganic matter of which it is chiefly composed has no adsorbent action and none can be imparted to it. My invention is concerned with materials which contain a predominating proportion of matter amenable to activation, and which do not have a composition and structure adapted to render them self-activating.

Whatever the origin of the primary carbon, I first subject it to a process of differential oxidation whereby the exposed adsorbed hydrocarbons (meaning thereby those hydrocarbons which are accessible to the oxidizing agent) are substantially eliminated, with minimum oxidation only of the active carbon base. This may be effected in various ways, but preferably by subjecting the primary carbon, previously freed by distillation if necessary from non-adsorbed or associated hydrocarbons, to a current of steam or carbon dioxid or mixtures thereof at carefully controlled temperatures; preferably lying between 800°–1000° C., the primary carbon being preferably disposed in relatively thin layers. I continue the above described treatment until the exposed hydrocarbons are substantially eliminated, and I may then cool the product to such temperature that it may be discharged from the furnace without danger of burning. If the operation has been properly carried out the product, aside from a greater or less ash content depending upon its origin, will consist substantially of active carbon, and will be found far more active, as regards adsorptive capacity for gases, than any charcoal heretofore available, whether of animal or vegetable origin. The activity of the carbon may be tested as hereinafter described.

Gaseous chlorin is capable of combining with and bringing about the elimination of adsorbed hydrocarbons, and may be either used alone, or preferably in alternation with steam. It acts therefore in this reaction essentially as an oxidizing agent, and is included in the term as employed herein. Air may be used, but at decidedly lower temperatures, (around 350°–450° C.) and with less satisfactory results, especially as regards the percentage yield of active carbon.

In this connection it may be explained that in the ordinary process of distillation of carbonaceous materials at relatively low temperatures, active carbon is first formed by the thermal decomposition of unstable hydrocarbons. This active carbon adsorbs a further quantity of hydrocarbons, and these adsorbed hydrocarbons are thereby stabilized to a remarkable extent; so that they are retained under conditions of temperature, pressure, etc., at which they would otherwise be quickly eliminated. For example anthracene cannot ordinarily exist in solid or liquid phase at normal pressure at temperatures in excess of its boiling point, 360° C.; nevertheless I have found considerable quantities of a hydrocarbon essentially similar to anthracene in cedar-wood charcoal which had been previously calcined to 800° C. This aptly illustrates the power of active carbon to stabilize its adsorbed materials. This also explains why ordinary distillation processes whether carried out at atmospheric or lower pressures or even under the highest attainable vacuum, are wholly inadequate for the production of an active carbon as distinguished from a primary carbon. Sufficiently prolonged heating of the primary carbon at extremely high temperatures will, it is true, serve partially to remove or break down the adsorbed hydrocarbons, but on account of the stability of the adsorption-complex the temperatures necessary for this purpose are so high that another difficulty is encountered, namely, that of so-called "gas-treating", which as above stated results in the deposition of inactive carbon in and on the active carbon base; and since this inactive carbon is decidedly more difficult to oxidize than is active carbon, it cannot be successfully removed from the active carbon by differential oxidation. Hence it is essential to the proper practice of this process that the deposition of inactive carbon should be substantially avoided at every stage of the operation, including the production of the primary carbon. At the same time considerable latitude is permissible in the actual carrying out of the process, for the reason that the tendency to gas-treatment has been found to vary with the chemical nature of the adsorbed hydrocarbons, that is, whether their decomposition takes place at a low or at a high temperature, the temperature at which molecular carbon is set free being apparently a controlling factor in determining its activity. For example methane ($CH_4$) cracks or gas-treats appreciably only above 700° C., and therefore yields only inactive carbon. Carbon deposited from carbon monoxid (CO) at 300° C. by the aid of catalysts is on the other hand of the active modification. Acetylene ($C_2H_2$) also cracks at low temperatures, namely, around 300° C., and the deposited carbon is more or less active and can be further activated by my process. The hydrocarbons present in bituminous coals are found to deposit inactive carbon much more readily than the hydrocarbons derived from certain other carbon complexes, such as may be prepared from certain woods and nuts. Hence it is that the adsorptive carbon of commerce was heretofore produced only from the latter sources, and not by reason of any inherent impossibility of preparing active carbon from coals, petroleum and other mineral deposits.

The differential oxidation of the adsorbed hydrocarbons as described above, when properly carried out, yields a carbon product having the maximum activity per unit of surface. However, the amount of surface exposed per unit volume of the material may vary widely, and I prefer to subject the active carbon, either before or after cooling, to a further treatment by limited oxidation whereby the surface exposed per unit of volume is brought practically to a maximum. This I accomplish by subjecting the active carbon, after being freed from exposed hydrocarbons, to a current of steam or other gaseous oxidizing agent, preferably at a temperature of about 800°–1000° C., the operation being continued until the apparent density of the particle falls to a value lying between 0.5 and 1.0; and preferably until the apparent density more or less closely approximates the value 0.66. I have demonstrated experimentally that this is the point at which the particle possesses the maximum exposed surface relative to its volume.

The values given above are for what I term "block density", that is to say the apparent density of a carbon block or granule per se. Adsorbent carbon is generally used in granular form and the block density differs from the apparent density of the entire granular mass, since the latter value takes into account the voids between the granules. For gas warfare adsorbent carbon is usually ground to pass through a No. 8 mesh onto a No. 10 mesh Tyler standard screen. With this fineness the apparent density 0.66 in the particles corresponds to about 0.41 apparent density of the entire granular mass.

Since an apparent density of substantially 0.66 is the optimum value for adsorbent carbon, it follows that carbon having an original density below this value cannot be given by activation the maximum adsorptive capacity per unit of volume of which carbon is capable, although such activation may greatly increase the adsorptive capacity by the removal of adsorbed hydrocarbons.

In illustration of this, cedar-wood charcoal prepared by the usual processes has an average apparent density of the individual particle in the neighborhood of 0.40, and an average adsorbent life with chlorpicrin under test conditions as described below of about 10 seconds. On activating this by differentially oxidizing adsorbed hydrocarbons as described above, the adsorbent life under the same test conditions may be raised to 225 minutes, which surpasses the life of any carbon known prior to my invention. The cedar charcoal, however, cannot be raised to the maximum life of which active carbon is capable (substantially 1000 minutes) because the effect of further channelling of the particles by oxidizing the carbon particle itself serves only further to reduce the density, and consequently further to diminish the adsorptive capacity.

On the other hand cocoanut charcoal prepared by the usual processes has an average density of about 1.17 and the adsorbent life under the conditions previously referred to is about five minutes. By activating this cocoanut charcoal in accordance with my process, all of the exposed hydrocarbons can be differentially oxidized without bringing the apparent density down to the desired value of about 0.66. The oxidation can therefore be further continued to channel out the active carbon itself, and thereby to increase still further the ratio of exposed surface to volume. If this channelling out process be continued until the apparent density is 0.66 the adsorbent life of the product will be found to be approximately 1000 minutes. It should however be understood that my invention is not limited to reducing the apparent density of the dense forms of charcoal to the absolute value 0.66, inasmuch as commercially practicable results are obtained with such dense forms at apparent densities lying between 0.5 and 1.0 as previously explained.

It will of course be understood that my invention is not limited to the treatment of primary carbons having a density as high as 1.17, though cocoanut charcoal having a block density of this order gives excellent results. When primary carbons having a density as low as 0.70 are differentially oxidized, the stabilized hydrocarbons contained therein may be substantially completely removed in many cases without bringing the block density below 0.50. If the limited oxidation be continued below the lower limit of 0.5 the effect is to decrease the exposed surface per unit of volume and thereby to reduce the adsorptive capacity of the product.

In view of the above described relation between the apparent density and the adsorptive capacity, it will be seen that dense carbonaceous materials should preferably be selected for producing charcoal or coke or the like for this purpose. Nevertheless, I have found that the maximum adsorptive capacity can be imparted to charcoal, coke, lamp-black or other forms of carbon of low apparent density by a special briquetting procedure as follows:—

The primary carbon of low apparent density is ground to fine powder, preferably to pass through a 200 mesh standard Tyler screen. It is then mixed with tar, pitch or other binder, molded, forced or otherwise shaped into briquettes or other forms, and then calcined to coke the binder. This calcination should be carried out under regulated conditions in order to avoid the deposition of inactive carbon as previously described. After calcination the briquettes are ground and activated by the differential oxidation of the adsorbed hydrocarbons as described above. The product thus prepared even from light forms of primary carbon will be found to have an apparent density above the value 0.66, and may then advantageously be subjected to limited oxidation until this value is sufficiently approximated.

Ordinary lampblack for example has a low adsorptive value, but by forming it into briquettes as specified a dense coke can be produced, which, on further activation, has given an adsorbent life with chlorpicrin of 850 minutes.

Also, the briquetting method as described above may be applied to relatively dense forms of primary carbon, as for example to the fines (from coal, nut-charcoal or the like) which would otherwise be rejected for the particular purpose in view.

In the preparation of briquettes as above described I may of course take advantage of any of the known processes for increasing the density of the product: for example it is well known in the carbon art that sulfur added in relatively small proportions, say about 5%, to the mix, materially increases the density of the product by fixing in the mass the carbon content of the pitch or tar binder.

In practice I find it satisfactory to calcine the briquettes at a rate of about 10° C. per hour until a temperature approximating 800° C. is reached, but it will be understood that no universally applicable directions for calcination can be given, since the optimum conditions may vary widely according to the type of furnace used, the weight of the charge, the nature of the original carbonaceous material and other factors. The essential point is that the calcination should be carried out without substantial gas-treatment, and in such manner as to leave the minimum practicable proportion of adsorbed hydrocarbons to be removed by the differential oxidation.

While I have referred to an adsorbent life of 1000 minutes under standard test conditions as being the approximate maximum value for carbon, it should be understood that this statement applies only to certain definite conditions. For example carbon ground to pass through a No. 12 screen onto a No. 14 (Tyler standard screens) gives a greater service life than this. However, the standard size of granule is through No. 8 onto No. 10 mesh so this has been adopted in the standard test which gives the 1000 minute life. This test consists essentially in passing a stream of air containing one part per thousand of chlorpicrin through a layer of 8–10 mesh carbon ten centimeters deep, in sufficient quantities to pass five hundred cubic centimeters of the gas mixture per minute through one square centimeter of surface of the carbon layer, until the effluent gas mixture imparts a distinct coloration to a copper flame indicating a concentration in the neighborhood of one part per hundred thousand of chlorpicrin.

In connection with the above test it should be understood that the absorption of the gas by the carbon is apparently partly capillary in character, the gas being held in the capillary interstices, and partly by adsorption, the gas being presumably condensed as a film upon the surface of the carbon. It is found that portions of the retained gas may be rather readily eliminated by subjecting the mass to a current of dry air or other gas, whereas other portions are retained for long periods or indefinitely under this treatment. It is believed that the gas held by capillary absorption represents the portion which is rather quickly eliminated by the gas current, while the portion which cannot be thus washed out is that which is adsorbed as a film. An absorption test carried out under conditions as described above may be regarded therefore as a measure of the combined capillary absorption and film adsorption, that is to say of the total absorptive value of the carbon.

The retentivity of the carbon, by which is meant its capacity for retaining the adsorbed gas may be determined by another form of test consisting essentially in passing a current of dry air over the carbon, which has been previously saturated with chlorpicrin or other gas, the retentivity for which is to be measured, until the rate of loss of weight falls below a fixed minimum value. For example in one form of the test conditions as now used dried air is passed over a sample of gas-saturated carbon at the standard rate of 500 c. c. per minute per square centimeter of section, until the concentration of chlorpicrin in the effluent falls below the fixed value chosen as a standard. For the specific case of chlorpicrin this standard is 35 parts per million. Under these conditions the most active carbon prepared as hereinabove described will retain in the neighborhood of 40% of its weight of chlorpicrin, whereas ordinary forms of carbon will retain amounts of the order of 1% or less; and even the recent German gas-mask carbon does not retain to exceed 10–12% under the same test conditions.

A modified form of the retentivity test, which can be much more quickly performed and affords sharper indications, consists in first saturating the active carbon with gas at room temperatures, and then placing it under high vacuum at 100° C., the charcoal being weighed at about half-hour intervals. After the capillary losses are complete, usually in the first one or two hours, the subsequent losses when charted, lie in a straight line curve. This curve, extrapolated back to the point of origin, gives a value which may be regarded as the specific retentive capacity of the sample. The values thus obtained are much more definite and sharply re-duplicated than those obtained by the first described test, and lie within a few percent of these values, being as a rule somewhat lower. For example samples prepared as described in this specification show under this test normal values of about 30–35% retentivity, with an upper limit of 40% or better. The retentivity of German charcoal under the conditions of this test does not exceed 5%.

A better understanding of various matters hereinbefore referred to will be had from the accompanying drawing, which shows graphically the variations in the properties of a cocoanut charcoal oxidized with steam for various periods. The drawing includes a curve illustrating each of the following:

hydrogen-content of the carbon; retentivity (expressed as weight-percentage of carbon-tetrachloride); saturation (also weight-percentage of carbon-tetrachloride); block density; and retentivity per unit volume of carbon, computed from the data used in plotting the "retentivity" and "block density" curves.

It will be observed that the hydrogen-content of the material decreases rapidly for a time and then comes to a practically constant value. The period of rapid decrease obviously corresponds to selective removal of hydrocarbons. It is only after selective removal of hydrocarbons ceases and the active carbon skeleton is laid bare that the saturation and retentivity values become considerable.

It will be understood that the ordinates of the saturation curve represent total sorbed vapor, and therefore include both the carbon-tetrachloride represented by the retentivity curve and that which is held in the capillaries of the carbon. The block density of the carbon diminishes throughout the test, indicating a progressive increase in porosity, and the saturation value increases continuously because of the increase in capillary volume. The "retentivity" reaches a limiting value, however, indicating that beyond a certain point there is no further increase in surface per unit weight of the material, since all the evidence supports the view that retentivity is a surface phenomenon.

Since retentivity with reference to mass of carbon reaches a limiting value, and since mass per unit volume (density) decreases continuously, as shown by one of the curves, it will be apparent that retentivity per unit volume of carbon will fall off beyond a certain maximum, as has been graphically shown on one of the curves. This maximum is important from the industrial and military standpoints, as the space available for the sorbent is often strictly limited.

In defining my invention, however, I do not desire to be restricted to the maximum retentivity of approximately 40% of chlorpicrin, since retentive values in excess of about 20% indicate an altogether novel and highly valuable commercial product. Furthermore, in accordance with my invention such retentivity is imparted to a relatively dense material, the preferred range of block density in the finished product being 0.5 to 1.0 as has already been stated. Even with the density at the lower limit of the preferred range and a retentivity of only 20%, it will be seen that grains of the material having an aggregate volume of one cubic centimeter are capable of retaining 100 mg. of chlorpicrin under the described test conditions. The retentivity referred to volume of carbon grains (exclusive of voids) differentiates the product of my invention from prior carbons even more strikingly than does the retentivity referred to weight of carbon, since all the prior carbons having appreciable retentivity were of very low density. While the total absorption and the retentivity have been expressed in terms of chlorpicrin, by reason of the necessity for having a definite standard, it is to be understood that similar general relations hold for other gases, although of course the absolute weights absorbed or retained will vary greatly according to the molecular weight, specific gravity, boiling point and other physical constants of the particular gas.

Neither do I desire to be restricted to the maximum adsorbent life of approximately 1000 minutes under the standard test conditions described herein, since an adsorptive life in excess of 225 minutes indicates a material which is both new and useful.

This application is a continuation of my copending application, Serial No. 251,263, filed Aug. 24, 1918.

I claim:—

1. Process of making a highly adsorptive carbon, comprising subjecting a primary carbon, consisting essentially of an adsorption-complex of active carbon and stabilized hydrocarbons, to differential oxidation until the exposed hydrocarbons are substantially eliminated and the residual carbon acquires a retentive value for chlorpicrin in excess of 20% of its weight.

2. Process of making a highly adsorptive carbon, comprising subjecting a primary carbon, consisting essentially of an adsorption-complex of active carbon and stabilized hydrocarbons, to differential oxidation until the exposed hydrocarbons are substantially eliminated, and subjecting the residual active carbon to limited oxidation until it has acquired substantially the maximum retentivity per unit of volume.

3. Process of making a highly adsorptive carbon, comprising subjecting a primary carbon, consisting essentially of an adsorption-complex of active carbon and stabilized hydrocarbons, to differential oxidation by means of a gaseous oxidizing agent until the exposed hydrocarbons are substantially eliminated and the residual carbon acquires a retentive value for chlorpicrin in excess of 20% of its weight.

4. Process of making a highly adsorptive carbon, comprising subjecting a primary carbon, consisting essentially of an adsorption-complex of active carbon and stabilized hydrocarbons, to differential oxidation by means of a gaseous oxidizing agent until the exposed hydrocarbons are substantially eliminated, and subjecting the residual active carbon to limited oxidation until it has acquired a retentivity for chlorpicrin in excess of 100 milligrams per cubic centimeter of grain-volume.

5. Process of making a highly adsorptive carbon from coal, comprising subjecting the coal to differential oxidation until the exposed hydrocarbon components are substantially eliminated, and subjecting the residual active carbon to limited oxidation until it has acquired a retentivity for chlorpicrin in excess of 100 milligrams per cubic centimeter of grain-volume.

6. Process of making highly adsorptive carbon, comprising subjecting a carbonaceous material to low-temperature distillation to expel volatile components while avoiding deposition of inactive carbon, producing thereby a primary carbon consisting essentially of an adsorption-complex of active carbon and stabilized hydrocarbons, subjecting said primary carbon to differential oxidation until the exposed hydrocarbons are substantially eliminated, and subjecting the residual active carbon to limited oxidation until it has acquired substantially the maximum retentivity per unit of volume.

7. Process of making a highly adsorptive carbon from coal, comprising subjecting the coal to low-temperature distillation to expel volatile components while avoiding deposition of inactive carbon, producing thereby a primary carbon consisting essentially of an adsorption-complex of active carbon and stabilized hydrocarbons, subjecting said primary carbon to differential oxidation until the exposed hydrocarbons are substantially eliminated, and subjecting the residual active carbon to limited oxidation until it has acquired a retentivity for chlorpicrin in excess of 100 milligrams per cubic centimeter of grain-volume.

8. Process of making a highly adsorptive carbon from carbonaceous materials, comprising grinding, bonding and shaping the carbonaceous material, calcining the same, under conditions to avoid substantial formation of inactive carbon, and subjecting the resulting primary carbon to differential oxidation until the exposed hydrocarbons are substantially eliminated, and subjecting the residual active carbon to limited oxidation until it has acquired a retentivity for chlorpicrin in excess of 100 milligrams per cubic centimeter of grain volume.

9. Process of making a highly adsorptive carbon from carbonaceous materials of low apparent density, comprising grinding, bonding and shaping the carbonaceous material, calcining the same under conditions to avoid substantial formation of inactive carbon, thereby producing a primary carbon of relatively high apparent density as compared with the original material, subjecting said primary carbon to differential oxidation until the exposed hydrocarbons are substantially eliminated, and subjecting the residual active carbon to limited oxidation until it has acquired a retentivity for chlorpicrin in excess of 100 milligrams per cubic centimeter of grain-volume.

10. Process of making a highly adsorptive carbon, comprising subjecting a primary carbon having a block density greater than 0.70 and consisting essentially of an adsorption-complex of active carbon and stabilized hydrocarbons, to differential oxidation until the exposed hydrocarbons are substantially eliminated, and subjecting the residual active carbon to limited oxidation until it has acquired substantially the maximum retentivity per unit of volume.

11. Process of making a highly adsorptive carbon, comprising subjecting a primary carbon having a block density greater than 0.70 and consisting essentially of an adsorption-complex of active carbon and stabilized hydrocarbons, to differential oxidation by means of a gaseous oxidizing agent until the exposed hydrocarbons are substantially eliminated, and subjecting the residual active carbon to limited oxidation until it has acquired a retentivity for chlorpicrin in excess of 100 milligrams per cubic centimeter of grain volume.

12. As a new article of manufacture, highly adsorptive carbon substantially free from exposed hydrocarbons and from inactive carbon, having a retentivity for chlorpicrin in excess of 100 milligrams per cubic centimeter of grain-volume.

13. As a new article of manufacture, highly adsorptive carbon derived from coal, said carbon substantially free from exposed hydrocarbons and from inactive carbon, having a retentivity for chlorpicrin in excess of 100 milligrams per cubic centimeter of grain-volume.

14. As a new article of manufacture, adsorptive carbon having a retentive value for chlorpicrin in excess of 20% of its weight.

15. As a new article of manufacture, adsorptive carbon having a retentive value for chlorpicrin of approximately 40% of its weight.

16. As a new article of manufacture, highly adsorptive carbon substantially free from exposed hydrocarbons and from inactive carbon, having a block density greater than 0.50, and having a retentivity for chlorpicrin in excess of 20% by weight.

17. As a new article of manufacture, adsorptive carbon having an adsorbent life in excess of 225 minutes on test comprising passing a stream of air containing one part per thousand of chlorpicrin through a layer of 8-10 mesh carbon ten centimeters deep, in sufficient quantities to pass five hundred cubic centimeters of the gas mixture per minute through one square centimeter of surface of the carbon layer, until the effluent gas mixture imparts a distinct coloration to a copper flame.

18. As a new article of manufacture, adsorptive carbon in granular form having an adsorbent life for chlorpicrin approximating 1000 minutes on test comprising passing a stream of air containing one part per thousand of chlorpicrin through a layer of 8-10 mesh carbon ten centimeters deep, in sufficient quantities to pass five hundred cubic centimeters of the gas mixture per minute through one square centimeter of surface of the carbon layer, until the effluent gas mixture imparts a distinct coloration to a copper flame.

In testimony whereof, I affix my signature.

NEWCOMB K. CHANEY.